US008868458B1

(12) United States Patent
Starbuck et al.

(10) Patent No.: US 8,868,458 B1
(45) Date of Patent: Oct. 21, 2014

(54) REMOTE ACCOUNT CONTROL SYSTEM AND METHOD

(75) Inventors: Rick Starbuck, Walnut Creek, CA (US);
Jaeson Paul, El Sobrante, CA (US);
Brad X. Lucas, San Francisco, CA (US); Ravi Acharya, Philadelphia, PA (US)

(73) Assignee: JPMorgan Chase Bank, N.A.

( * ) Notice: Subject to any disclaimer, the term of this patent is extended or adjusted under 35 U.S.C. 154(b) by 414 days.

(21) Appl. No.: 12/858,749

(22) Filed: Aug. 18, 2010

Related U.S. Application Data

(60) Provisional application No. 61/303,782, filed on Feb. 12, 2010.

(51) Int. Cl.
*G06Q 40/00* (2012.01)

(52) U.S. Cl.
USPC .......................................................... 705/35

(58) Field of Classification Search
CPC ........ G06Q 40/00; G06Q 20/22; G06Q 20/29
USPC .................... 705/1–310; 235/1–80; 380/1–88
See application file for complete search history.

(56) References Cited

U.S. PATENT DOCUMENTS

| 6,298,336 | B1 | 10/2001 | Davis et al. |
| 6,535,855 | B1 | 3/2003 | Cahill et al. |
| 7,493,288 | B2 | 2/2009 | Biship et al. |
| 7,571,142 | B1 | 8/2009 | Flitcroft et al. |
| 2002/0077978 | A1 | 6/2002 | O'Leary et al. |
| 2004/0019563 | A1 | 1/2004 | Sines et al. |
| 2004/0230536 | A1 | 11/2004 | Fung et al. |
| 2005/0131815 | A1* | 6/2005 | Fung et al. ................... 705/39 |
| 2006/0074698 | A1 | 4/2006 | Bishop et al. |
| 2006/0122943 | A1 | 6/2006 | Mann et al. |
| 2007/0022008 | A1* | 1/2007 | Kingsborough et al. ....... 705/14 |
| 2007/0295801 | A1* | 12/2007 | Harris ........................... 235/375 |
| 2009/0070272 | A1* | 3/2009 | Jain ............................... 705/75 |

FOREIGN PATENT DOCUMENTS

WO    WO-9745814    12/1997

OTHER PUBLICATIONS

Keesler staffs, General Accounting and Finance System Interactive Communications Interface (ICI) and Pseudo Processor for Batch (PSUPRB), Nov. 29, 2002, web 1-18.*

* cited by examiner

*Primary Examiner* — Marissa Liu
(74) *Attorney, Agent, or Firm* — Goodwin Procter LLP

(57) ABSTRACT

A computer-implemented remote control method and system are disclosed for providing financial account security to prevent unauthorized use of the financial account. The method may include providing, for an account holder device, a graphical user interface for facilitating automatic activation and deactivation of the financial account and receiving over a network from the account holder device, an account holder command entered through the provided graphical user interface. The method may additionally include authenticating the account holder command and processing the account holder command entered through the provided graphical user interface using a command processing engine including computer processing components, the command processing engine changing an account status from an active state to an inactive state or from an inactive state to an active state in accordance with the received command.

10 Claims, 8 Drawing Sheets

REMOTE ACCOUNT CONTROL SYSTEM AND METHOD

RELATED APPLICATION DATA

This application claims priority to U.S. Provisional Patent Application Ser. No. 61/303,782, filed on Feb. 12, 2010.

TECHNICAL FIELD

Embodiments of the invention are related generally to systems and methods for remotely controlling a financial account and have particular application to controlling a financial account associated with a card, such as a debit, credit, or stored value card.

BACKGROUND OF THE INVENTION

Currently, financial account holders utilize their accounts whenever they choose, for example by using a credit card to make a purchase at a point of sale (POS), over the phone, or over the Internet. In the case of a checking account, account holders write checks to be cleared at some future undetermined time. The checks are generally cleared without further input from the account holder.

In the event that an account holder misplaces a card or a checkbook, the account holder can contact the financial institution sponsoring the account by telephone or in person and place a temporary hold on the account. In the event that a card or account information is stolen, the account holder can cancel the account and open a new account.

While these options serve to terminate fraud, they may not serve to prevent fraud or give account holders control over the disposition of their accounts.

Thus, a solution is needed that has application for lost or stolen cards and serves as a precautionary measure to warn both an account holder and a financial institution when the account holder is not expecting to make any purchases during a specified time frame. The solution should further make the account unavailable to unauthorized users when the account holder has reason to suspect such unauthorized use.

SUMMARY OF PREFERRED EMBODIMENTS

Embodiments of the present invention are directed to an account remote control system and method that enables an account holder to remotely activate and de-activate an account. Embodiments of the invention have particular application to card accounts but may also apply to checking accounts.

In one aspect of the invention, a computer-implemented remote control method for providing financial account security is provided to prevent unauthorized use of the financial account. The method includes providing, for an account holder device, a graphical user interface for facilitating automatic activation and deactivation of the financial account and receiving over a network from the account holder device, an account holder command entered through the provided graphical user interface. The method additionally includes authenticating the account holder command and processing the account holder command entered through the provided graphical user interface using a command processing engine including computer processing components. The command processing engine operates in order to change an account status from an active state to an inactive state or from an inactive state to an active state in accordance with the received command.

In a further aspect of the invention, a computer-implemented account control system provides financial account security to prevent unauthorized use of the financial account. The system includes user interface components providing a graphical user interface for display on an account holder device, the graphical user interface for facilitating automatic activation and deactivation of the financial account. The system additionally includes authentication and verification components receiving account holder commands over a network from the account holder device, each account holder command entered through the provided graphical user interface, the authentication and verification components verifying command authenticity. The system additionally includes command processing components for processing the account holder command entered through the provided graphical user interface, the command processing changing an account status from an active state to an inactive state or from an inactive state to an active state in accordance with the received command.

DESCRIPTION OF DRAWINGS

Embodiments of the present invention are directed to an account remote control system and method that enables an account holder to remotely activate and de-activate an account. Embodiments of the invention have particular application to card accounts but may also apply to checking accounts. The system is capable of operating automatically to control account processing in response to the direction of the user without requiring manual intervention.

Figure 1:
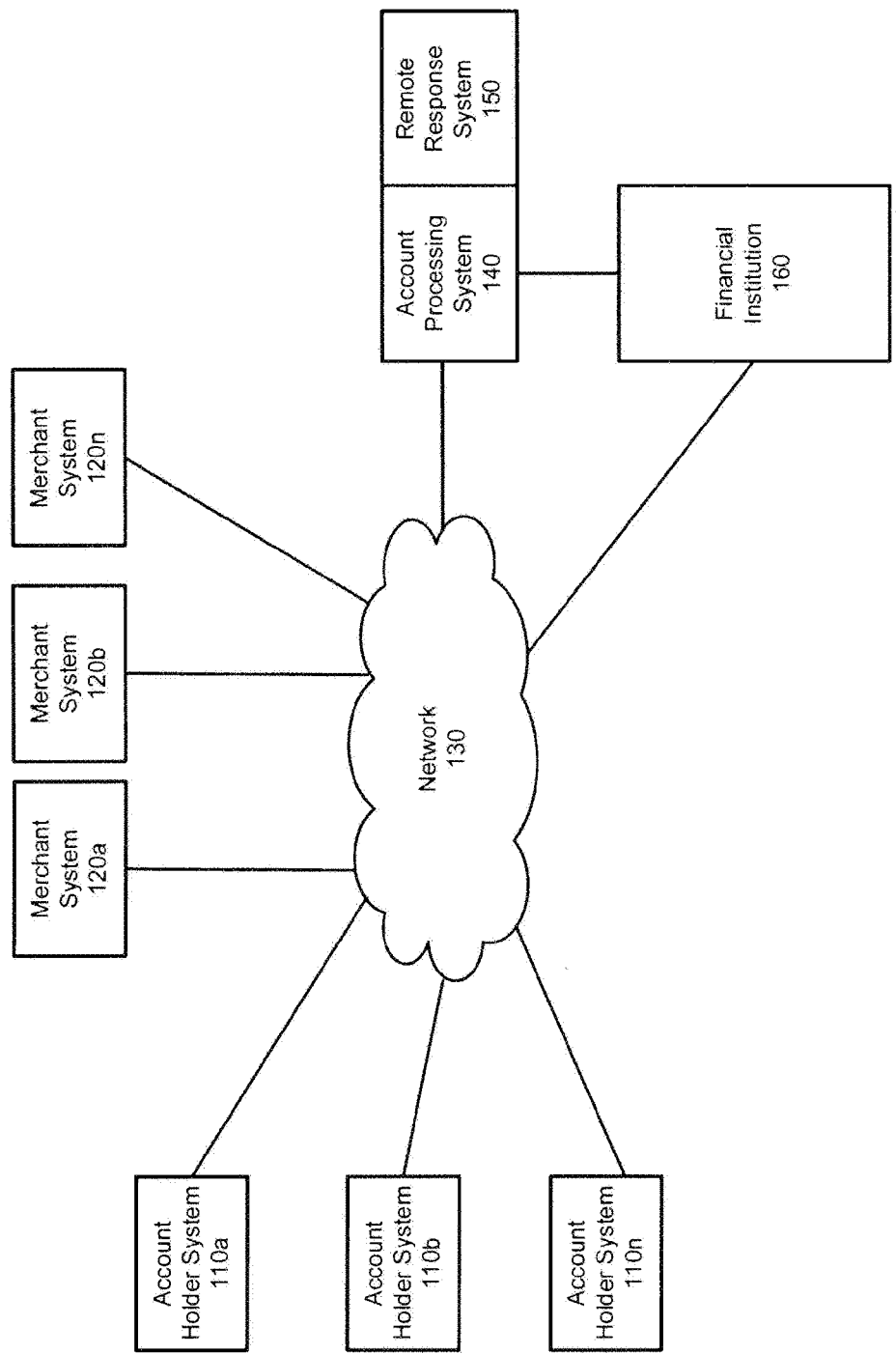
FIG. 1 is a block diagram illustrating an operating environment for a system in accordance with an embodiment of the invention.

FIG. 1 is a block diagram illustrating a remote response system environment in accordance with an embodiment of the invention. Account holders 110a . . . 110n may be connected over a network 130 to a financial institution 160 and an account processing system 140 associated with or including a remote response system 150. Merchant systems 120, 120b, and 120n may additionally be connected over the network 130 with the remote response system 150.

In this embodiment, the account holders 110a . . . 110n may have accounts, such as, for example, credit card accounts with the financial institution 160. Thus, the account processing system 140 associated with the financial institution 160 operates in conjunction with a remote response system 150 that may be integral with the account processing system 140. In operation, the account holders 110a . . . 110n may activate a trigger to send a signal to turn the credit account ON or OFF. The remote response system 150 receives the signal and notifies the account processing system 140 of the change in status of the account.

The account holders 110a, 110b . . . 110n may typically be individuals connecting over the network 130 to the central account processing system 140 through the use of computing devices such as desktop, laptop, portable computing devices, or mobile devices. The account holders 110a, 110b . . . 110n may hold one or more accounts with the financial institution 160. The types of accounts may include credit card accounts, debit card accounts checking accounts, any type of loan account, such as a HELOC, or mortgage account, or other types of accounts.

The merchant systems 120a, 120b, 120n may include point of sale terminals or other equipment used by merchants to initiate a sale and connect over a network for payment processing.

In embodiments of the invention, the remote response system 150, central account processing system 140 and/or financial institution 160 may provide an interface accessible over the network 130 to display account information and receive input from the account holders 110. The account holders 110 may provide account activation/deactivation instructions through the provided interface. Alternatively, the account holders 110 may simply be provided with a phone number or email address associated with the remote response system 150 and may send an ON or OFF signal to that phone number or email address.

Furthermore, the remote response system 150 may communication with merchant systems 120a . . . 120n in order to convey the status of an account of an account holder attempting to make a purchase. For example, if a purchaser is attempting to make a purchase with an account that has been deactivated, the remote response system 150 may notify the merchant 120 through the merchant equipment connected over the network 130.

The network 130 is preferably the Internet, but may be or include other types of networks. The network 30 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The account processing system 140 may be a pre-existing account processing system and may be adapted to interface, with the remote response system 150. Alternatively, the remote response system 150 may be integrated with the account processing system 140.

The remote response system 150 provides an account remote control system that enables an account holder to remotely activate and de-activate an account. In embodiments of the invention, the system controls credit accounts, but may also apply to debit accounts, checking accounts, or any other accounts held by a financial institution. The remote response system 150 has the capability to receive commands from the account holder systems 110 and execute the commands to activate and deactivate financial accounts automatically at the direction of the account holder without the requirement for manual intervention. The remote response system 150 may further communicate with the account processing system 140 to enable or disable use of the account.

The financial institution 160 may be or include any financial institution that holds accounts for account holders. As set forth above, the accounts may typically include a credit account, but may also include other types of financial accounts.

Figure 2:
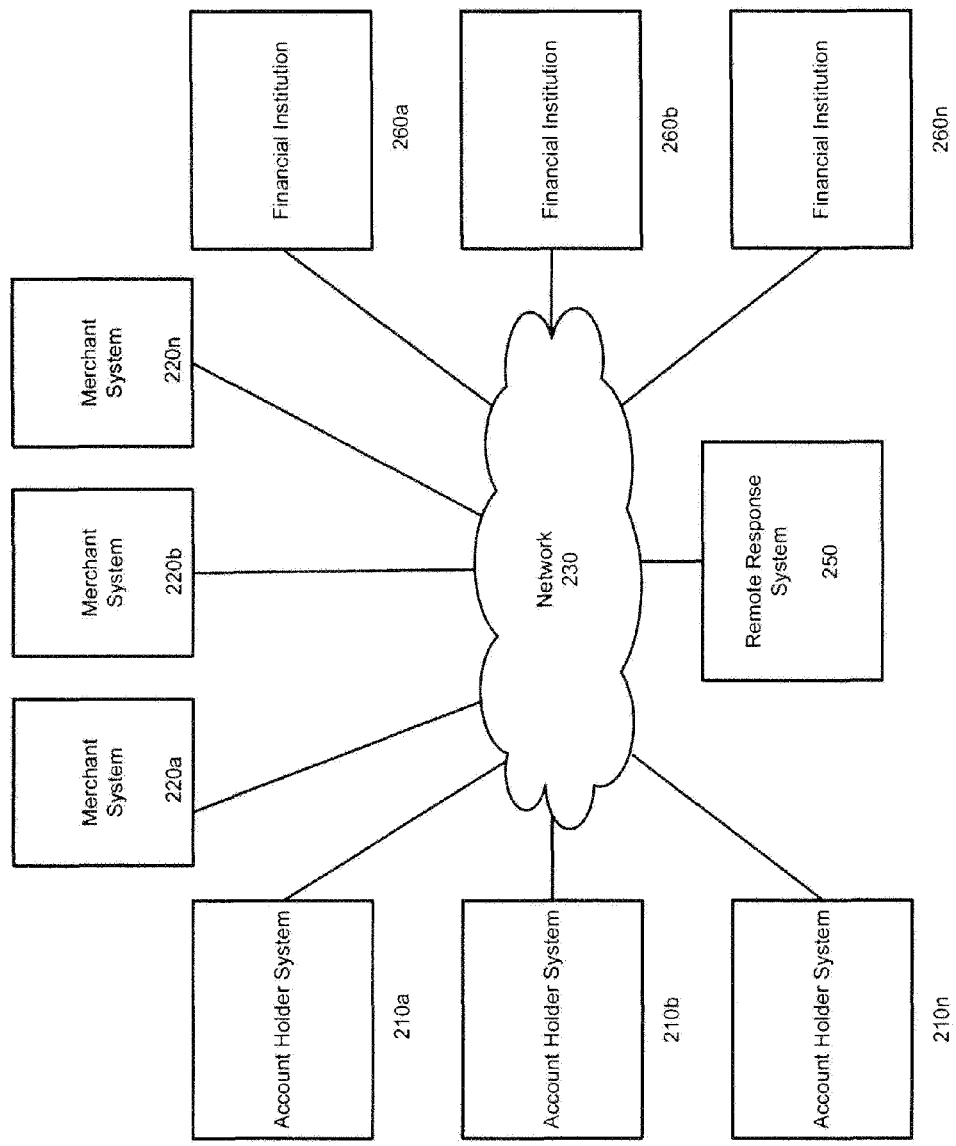
FIG. 2 is a block diagram illustrating an operating environment for a system in accordance with an alternative embodiment of the invention.

FIG. 2 is a block diagram illustrating an additional embodiment in which account holders 210a . . . 210n are connected over a network 230 with a remote response system 250 and financial institutions 260a . . . 260n. The remote response system 250 may communicate with card processing systems integral with the financial institutions 260a . . . 260n.

In the embodiment of FIG. 2, the components shown are substantially the same as those described above with respect to FIG. 1. However, the remote response system 250 may be operated by one of the financial institutions 260a . . . 260n or alternatively may be operated by another entity, such as for example an entity promoting fraud prevention. In this embodiment, it may be possible for the remote response system 250 to receive and send signals related to accounts from multiple financial institutions. Thus, if an account holder 210 has multiple credit cards in his wallet and loses the wallet, the account holder 210 may implement the remote response system 250 to set all of his credit cards to OFF.

Figure 3:
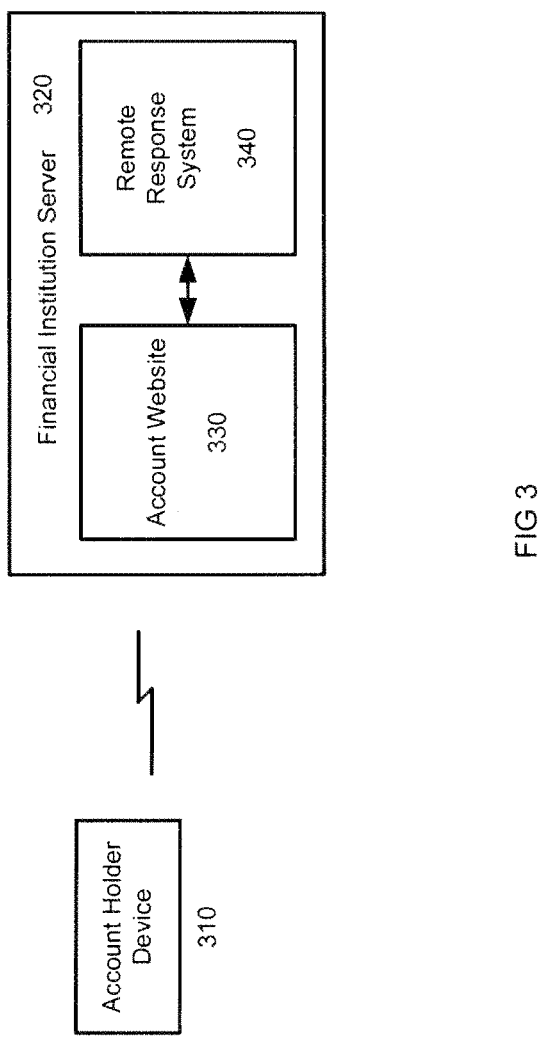
FIG. 3 is a block diagram illustrating operation of an embodiment of the invention.

FIG. 3 is a block diagram illustrating operation of an embodiment of the invention in which an account holder device 310 communicates from a remote location over a network with a financial institution server 320. The financial institution server 320 hosts an account website 330 and the remote response system 340, which are in communication with one another. Thus, account holder device 310 may be a personal computer or mobile device accessing an account website via a network such as the Internet. The account holder 310 may be accessing, for example, a credit account website, and may perform various functions, such as checking the balance or paying an outstanding bill. Additionally, the account holder may send a command to deactivate account usage. The command may be processed by the remote response system 340, which may convey the deactivation to the account website 330. Thus, while the account is in a deactivated state, the account holder accessing the account website 330 may be provided with a message or user interface through the account website alerting the account holder that his credit account is in a deactivated state.

Figure 4:
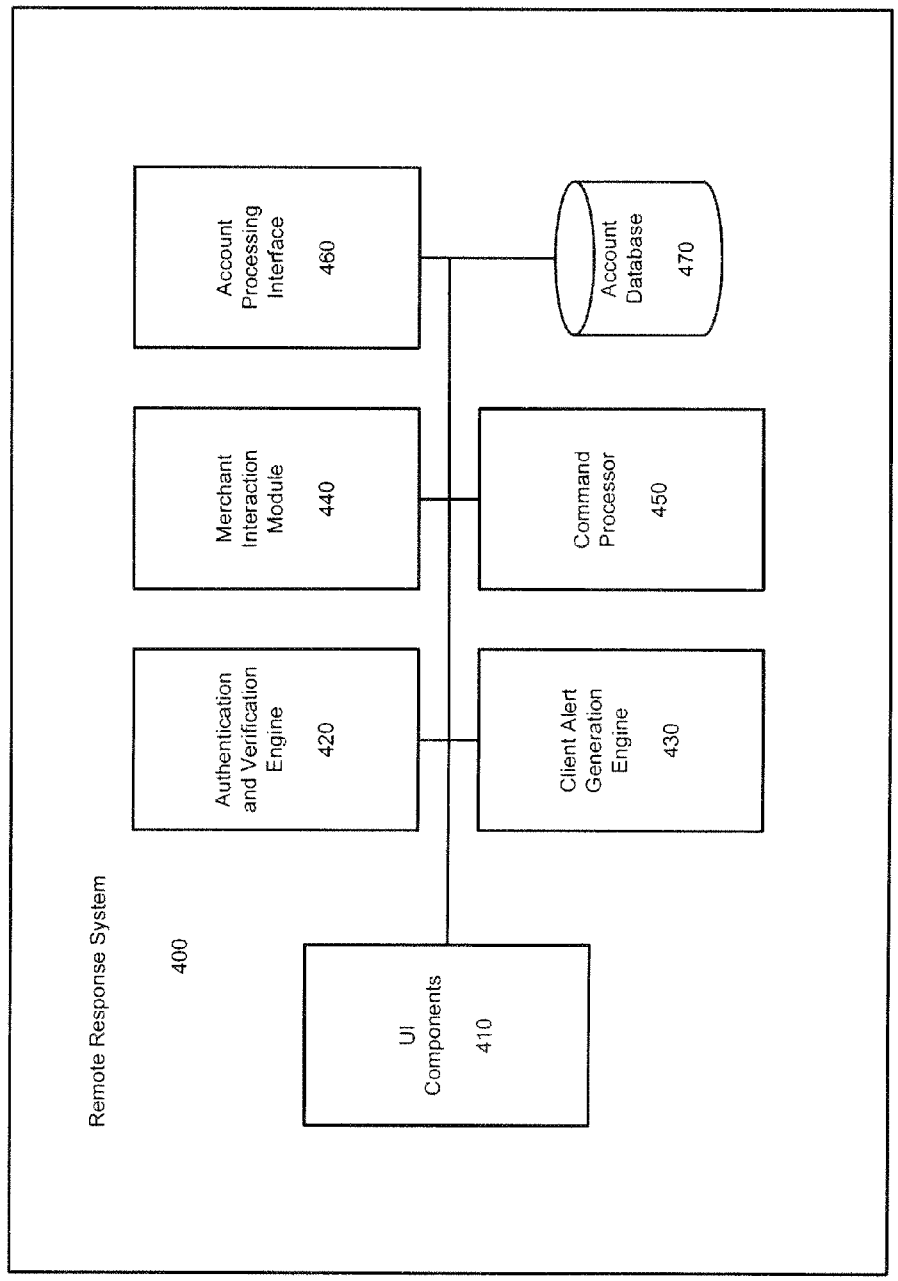
FIG. 4 is block diagram illustrating an embodiment of a remote response system in accordance with an embodiment of the invention.

FIG. 4 is block diagram illustrating an embodiment of a remote response system 400 in accordance with an embodiment of the invention. The remote response system 400 may include, for example, graphical user interface (UI) components 410, an authentication and verification engine 420, a client alert generation engine 430, a merchant interaction module 440, a command processor 450, an account processing interface 460, and an account database 470.

The UI components 410 may be provided by front end components of the remote response system 400. Different user interface configurations may be provided for personal computers and various mobile devices. Mobile devices may be provided with a straightforward ON/OFF command option. Initially, a menu may be provided to enable an account holder to select from a plurality of eligible accounts. This option may be provided, for example via two selectable buttons or a drop down menu.

Mobile devices having texting capabilities may not require a particular user interface in order to receive a command from an account holder during use in texting mode. Instead, account holders may merely text a first code to activate an account and a second code to deactivate an account. The code to activate may, for example, be "ON" and the code to deactivate may, for example, be "OFF". In order to first identify the account, the account holder may be required to transmit a pre-selected account identifier. Other choices may also be implemented. Additional codes may be used for different types of accounts. For example, with a checking, account, account holders may be able to text a check number along with the ON or OFF code, such that the account can easily be activated and deactivated for individual checks.

In addition to the simple ON/OFF interfaces, account holder devices may be equipped with more complex user interfaces that allow scheduling of activation, and deactivation. For example, a UI calendar may be provided that allows an account holder to select dates for activation and deactivation. Such an interface may, for example, be provided at an account web site provided by the financial institution holding the account. Even with the texting embodiment, the remote response system may understand various scheduling codes. For example, a code "ON46" may be used to turn activate the account for six hours or a code "OFFN3" may be used to deactivate the account in three hours. When the scheduling function is performed as described herein, the remote response system 400 may, in embodiments of the invention, send a notification to a registered computer or mobile device connected with an account when the account changes status in accordance with a scheduled command. The notification may be a text message, an email, a phone message, or any other type of notification that can appropriately be conveyed to the registered device.

In embodiments of the invention, the UI components 410 may also allow account holders to configure pre-approvals sent by account holders, such as for large purchases. Furthermore, in embodiments of the invention, the UI components 410 may provide selectable categories of goods and services and allow account holders to select an ON status for some goods and services and an OFF status for other goods and services. For example, the account may be ON for groceries and gas, but OFF for everything else. Similarly, the account holder may be able to set thresholds for different categories of goods or for specific merchants, such that purchases exceeding the threshold will be denied. Furthermore, the accountholder may be able to specify that the account must always remain ON for certain merchants or categories of goods or must always remain OFF for other merchants or categories of goods.

Particular UI configurations that may be implemented are further discussed below with reference to FIGS. 5 and 6.

The authentication and verification engine 420 may function to authenticate both the account holder and the account holder system or device. For example, the authentication and verification engine 420 may respond to image capture or biometric data collection in order to authenticate the account holder. The authentication and verification engine 420 may further check parameters such as, for example, IP address, in order to authenticate the transmitting device. Furthermore, passwords, security questions, and or other security measures may be implemented. In embodiments of the invention, a higher level of security may be required to activate an account than to deactivate the account. In further embodiments, the central account processing system may incorporate voice recognition and may recognize an incoming call from a registered phone number of the account holder. Background material incorporated herein by reference can be found in U.S. Pat. No. 6,535,855.

The client alert generation engine 430 may provide a number of alerts to the account holder. For example, the alert generation engine 430 may alert the account holder to a change in status, to an attempt to use a deactivated account, and further to transactions that were cleared regardless of the deactivation state. Transactions falling into the latter category may include transactions that are sent from a merchant terminal that was in stand-by mode at the time of the transaction. The alert in this instance may be sent in real time upon the attempt to clear the transaction and may notify the account holder, for example, via text, email, or push notification.

For example, an account holder may make a purchase from a vendor using a credit card when the card is an ON state. However, the vendor's system may have been in a stand by state at the time of purchase and the vendor may attempt to submit the purchase to the account processing system at a later point in time when some account holders have returned to an OFF state. Typically, in this instance, the vendor will be attempting to submit a batch of charges for multiple account holders. In this instance, the system may send an alert to account holders in the OFF state, specifying the charges and asking them if they would like the charges to clear. If the account holder rejects the transaction, the account processing system may decline it. A default setting may be implemented that allows the transaction to clear in the absence of a response from the account holder. Alternatively, the system may be configured to automatically allow batch transactions from small businesses that occur only once daily, or on a similar schedule, to clear as long as the accounts and question were activated during the business day.

Preferably, the client alert generation engine 430 will provide the account holder with the ability to accept or dispute the transaction in real time. In preferred embodiments of the invention, the alert will contain, the merchant name, description, address, transaction time, transaction date, and transaction amount, but may contain a subset of this data and may contain additional data. These alerts may be particularly useful, for example, to account holders who have distributed credit cards to family members. In response to the alert, the account holder may want to take action to deactivate the card or account if a family member is not authorized to make a purchase or if the account holder believes someone other than the family member is using the card.

Alerts may also be generated for the clearance of a pre-existing recurring transaction. In embodiments of the invention, recurring transactions are not blocked if the account is in OFF mode.

Furthermore, in embodiments of the invention, when an account holder deactivates the account, the client alert generation engine 430 may alert the account holder that certain transactions will not be blocked. Such transactions may include for example, recurring payments and payments made during stand-by mode of the merchant POS. While the account itself may be deactivated, the system may also be used to deactivate a card or device associated with the account, while leaving the account operational. For example, if a registered device is lost, stolen, or damaged, the account holder may contact the remote response system using an alternative mechanism, such as by phone or over the internet using an unregistered device. The account holder may be authenticated with an override PIN, biometric identification, security questions or a combination thereof and upon authentication, the account holder will be able to deactivate registered devices and/or cards or specific checks associated with an account.

The merchant interaction module 440 may interact with the merchant POS in order to provide a notice that an account has been deactivated to the merchant. Alternatively, this functionality may be incorporated in the account processing system that receives the information from the remote response system 400.

In preferred embodiments of the invention, the remote response system provides real time communication with merchants and card processing equipment at the point of sale, so that personnel at the point of sale can immediately be notified if a card has been deactivated. If the individual presenting the card is actually the account holder, the account holder can immediately re-activate the card using his or her mobile device if desired. The remote response system or account processing system may notify the account holder of the attempted use so that the account holder will be aware of the fraudulent attempt in the event that the account holder did not present the card.

The command processor 450 processes commands including the activation and deactivation commands from the account holders in real time. The command processor 450 operates in response to the commands after verification and authentication. The command processor 450 may access records in the account database 470 to ensure that the command is valid and is changing the state of the account.

In embodiments of the invention, the command processor 450 may process additional commands such as scheduling commands that provide account holders with the capability to schedule account activation and deactivation at particular points in time. Specific control signals could be implemented for different times or alternatively, account holders may access an Internet interface to execute scheduling.

In embodiments of the invention, the command processor 450 may further process pre-approvals, sent by account holders, such as for large purchases. Furthermore, embodiments of the invention allow for an ON state with respect to some categories of goods and services and a simultaneous OFF state with respect to other categories of goods and services. For example, the account may be ON for groceries and gas, but OFF for everything else.

Furthermore, the command processor 450 may process commands for setting up recurring payments. In other words, if a recurring payment is submitted and the card account is in an OFF state, the remote response system and account processing system may be configured to allow the approved recurring charges against the account to go through. For a new recurring payment, the system may implement a one time "ask" to account holders before allowing the charge to go through or allowing the charge to be categorized as a recurring pre-existing charge.

Thus, although the account holders issue the activation/deactivation instructions, the functionality for executing the instructions is located within the command processor 450 of the remote response system 400, which in embodiments of the invention is integral with the account processing system. The command processor 450 may be responsive to instructions issued by native applications such as Iphone applications or Blackberry applications. The command processor 450 may further be responsive to text messages or could implement a voice recognition unit (VRU) to respond to voice commands. In further embodiments, the remote response system 400 may be responsive to requests received via email, or may implement a website to receive online instructions from account holders.

The account processing interface 460 may communicate with an existing account processing system in order to confirm the status of an account and alter the status of the account after a command has bee processed.

The account database 470 may be internal or external to the remote response system 400. The account database 470 may alternatively be located within the account processing system and maybe accessed by the remote response system 400. The account database 470 preferably contains account information including the ON/OFF status of the account, so that the remote response system 400 can alter or confirm this status. The account database 470 may also include more comprehensive information related to each account.

All of the aforementioned components may be interconnected in order to work cooperatively. Furthermore, the components may comprise software, hardware, and a combination of software and hardware. Use of the various components in a computing environment is discussed below with reference to FIG. 7

Figure 5:
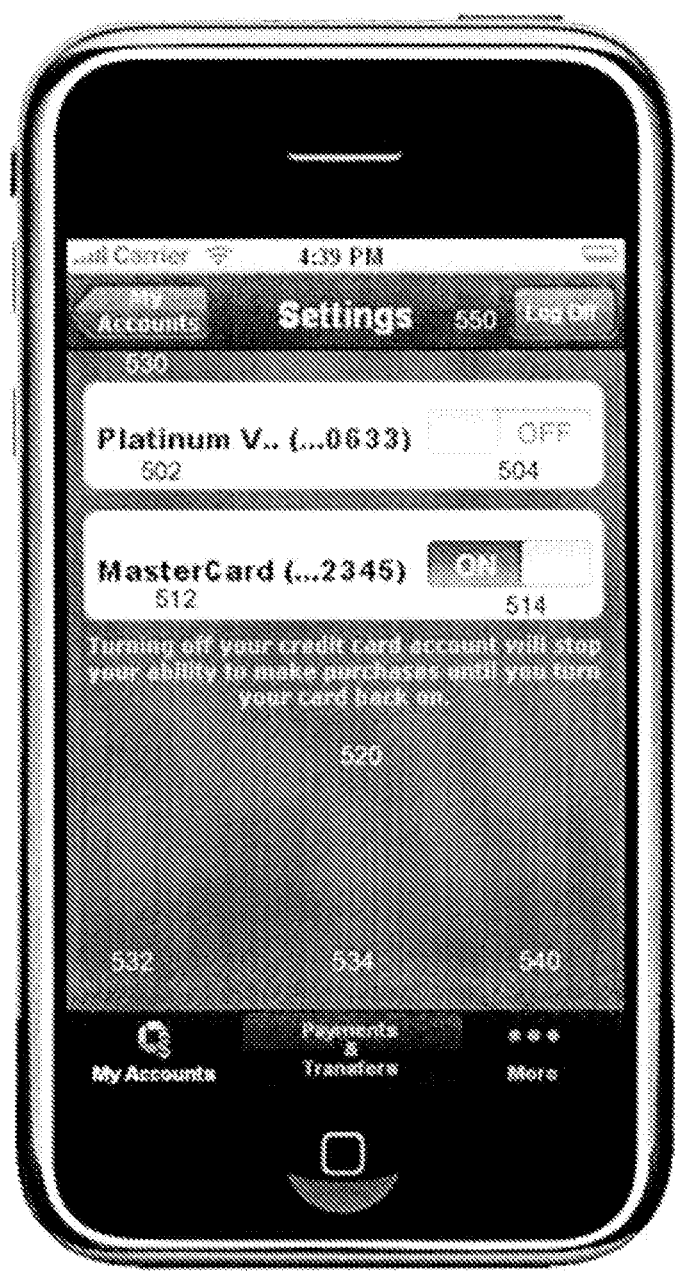
FIG. 5 illustrates an account holder device displaying a user interface in accordance with an embodiment of the invention.
Figure 6:
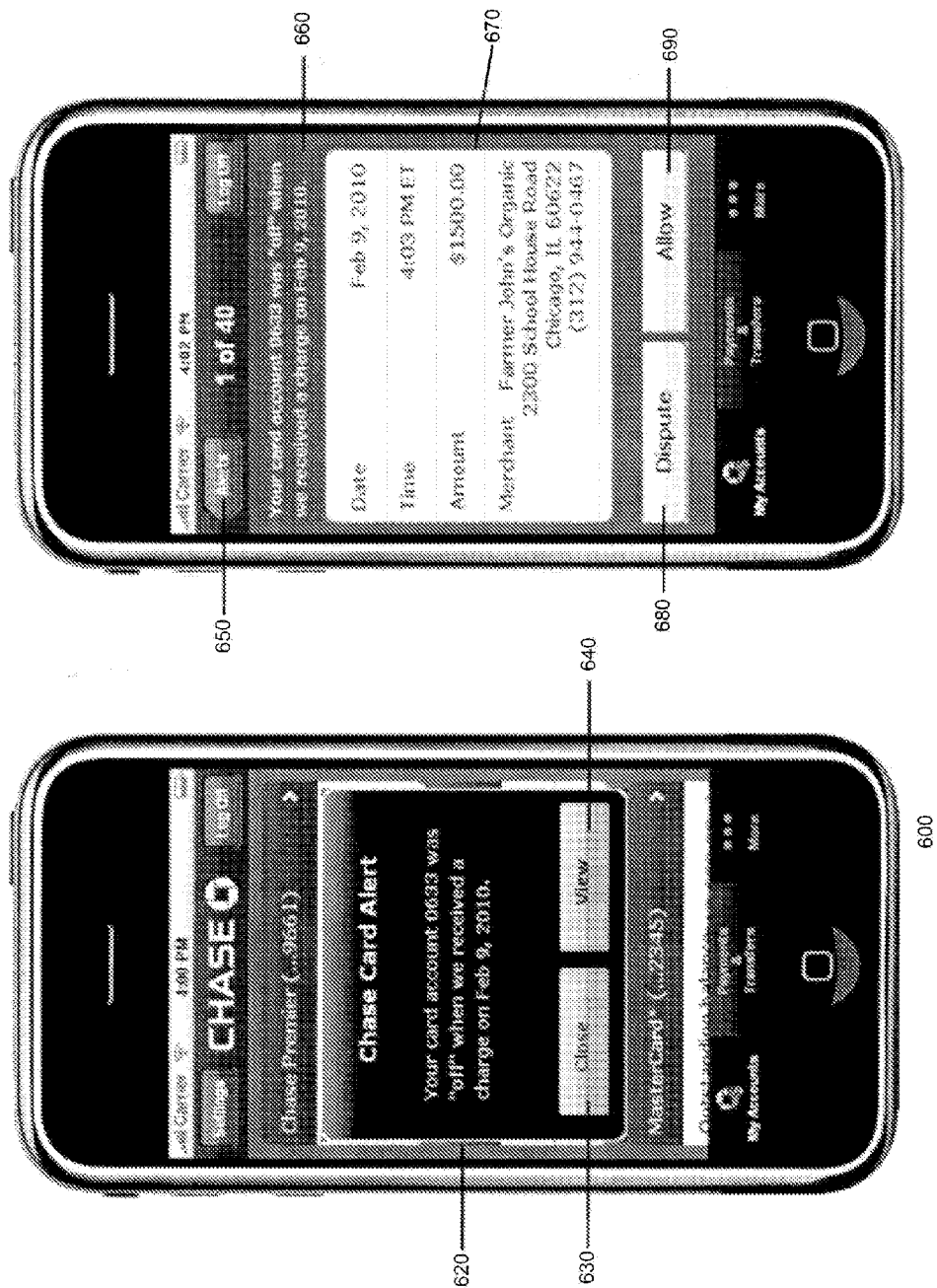
FIGS. 6A and 6B illustrate a screen display of an account holder device displaying a user interface in accordance with an embodiment of the invention.

FIG. 5 illustrates an account holder device displaying a user interface 500 in accordance with an embodiment of the invention. The user interface 500 may include an account selection options 530 and 532, payments and transfers option 534, additional options 540, and log off option 550. The interface 500 may additionally include selectable accounts 502 and 512 and ON/OFF indicators 504 and 514 to indicate the status of the account adjacent the account. Informational blurb 520 indicates that turning the card OFF will stop the ability to make purchases.

FIGS. 6A and 6B illustrate a screen display of an account holder device displaying a user interface in accordance with an embodiment of the invention. A user interface 600 may show a card alert 620 for a particular account. The card alert 620 indicates that the account was OFF and received a charge during that period. Selectable options 630 and 640 provide the ability to close the alert or view additional information. FIG. 6B is a user interface that may be displayed if the account holder elects to view additional information. Information line 650 indicates that 1 of 40 alerts is shown. The basic alert information is shown at 650 and particular merchant and transaction information is shown at 670. Selectable option 680 provides the account holder the option to dispute the charge referenced by the alert and selectable option 690 provides for the account holder to allow the charge referenced by the alert.

While the invention is primarily described using the example of a credit card, the scope is not limited in this manner. Different types of cards, such as debit, charge, expense, or stored value may be utilized. Furthermore, in addition to traditional plastic cards, other types of cards may implemented with the system of the invention. Near field communication (NFC), which is a short-range high frequency wireless communication technology enabling the exchange of data between devices, digital cards, and RFID technology may be implemented. Furthermore, stored digital value cards on mobile devices may be implemented and an interface may be provided to account holders for viewing balances and transactions. As explained herein, the remote response system may be used to deactivate or activate these devices for use with accounts controlled by the system. Three dimensional card readers may operate on these digital value cards to scan transactions.

Embodiments of the invention may allow checking account holders to activate and deactivate their accounts. This option may be particularly useful in the case of lost or stolen checks. Because check recipients do not cash checks in real time, the remote response system may be configured to respond to the deactivation instruction by providing the account holder with an alert for each check against the account, so that the account holder can provide an approval for checks actually written by the account holder.

The technology described herein has numerous applications. For example, in a family setting, parent account holders may use the remote response system to restrict activities of children who are cardholders on the same account. Furthermore, employer account holders may implement the technology to restrict the activities of employees holding cards accessing employer accounts.

In summary, a card issuer, financial institution, or other entity may operate the remote response system for receiving remote activations and deactivations. In embodiments of the invention, remote activation may be achieved through the use of a mobile device with texting capabilities. Activation may be achieved through texting of the word "ON". Deactivation may be achieved through texting the word "OFF". Further embodiments of the invention include a web site hosted by the central account processing system that allows the account holder to selectively activate and deactivate a card account by logging on to the web site. In embodiments of the invention, the activation/deactivation feature may be integrated with the account holder's account profile on the financial institution website, so that when an account holder logs in to view account activity, the account holder can select an ON setting or an OFF setting for the card account. Additionally, using the web site embodiment, the account holder may be able to schedule an ON period and an OFF period by selecting specific dates, for example through a drop-down menu. This embodiment may also be available to mobile devices.

The components of the environment described above, including the account holder systems, the remote response system, the account processing system, the merchant systems, and the financial institution may be implemented using one or more computing devices as described below.

Figure 7:
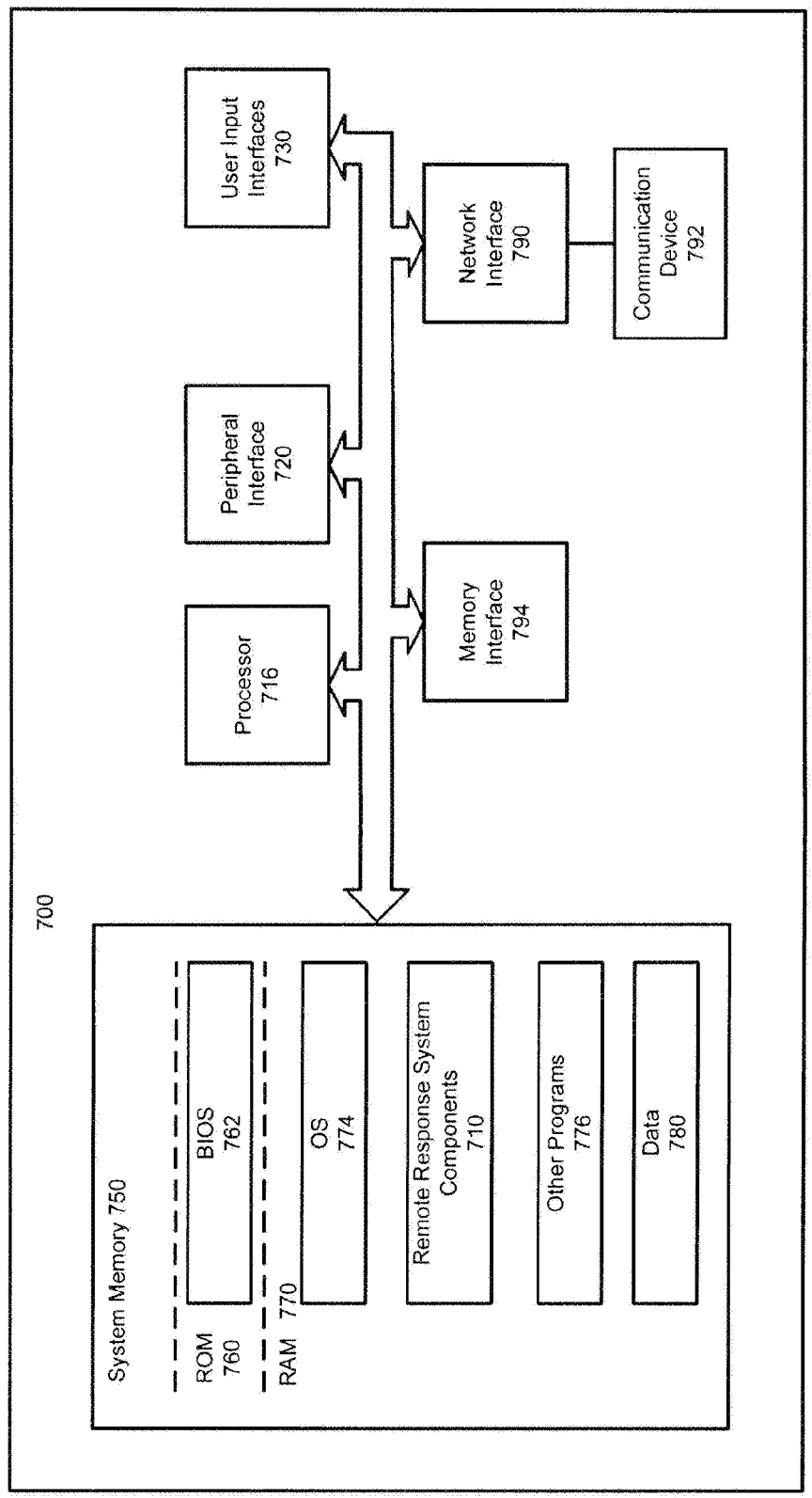
FIG. 7 is a block diagram illustrating a computing environment for implementing a method and system in accordance with an embodiment of the invention.

FIG. 7 is a block diagram illustrating a computing system 700 implementing remote response system applications that may be utilized in accordance with an embodiment of the invention. This configuration is merely exemplary and should not be construed as limiting. It is likely that multiple computing systems or devices will be utilized to implement the method and system in accordance with embodiments of the invention. The computing system 700 may include a processing unit 710, a peripheral interface 720, a user input interface 730, a system bus 740, a system memory 750, a network interface 790, a connected modem, transceiver, adaptor, or other communication device 792, and a memory interface 794. The system bus 740 may be provided for coupling the various system components.

Computers typically include a variety of computer readable media that can form part of the system memory and be read by the processing unit. By way of example, and not limitation, computer readable media may comprise computer storage media and communication media. The system memory 750 may include computer storage media in the form of volatile and/or nonvolatile memory such as read only memory (ROM) 760 and random access memory (RAM) 770.

A basic input/output system (BIOS) 762, containing the basic routines that help to transfer information between elements, such as during start-up, is typically stored in ROM 760. RAM 770 typically contains data and/or program modules that are immediately accessible to and/or presently being operated on by processing unit. The data or program modules may include an operating system 774, remote response system components 710, other program modules 776 and program data 780. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 750 includes at least one set of instructions that is either permanently or temporarily stored. The processor 710 executes the instructions that are stored in order to process data. The set of instructions may include various instructions that perform a particular task or tasks, such as those shown in the appended flowcharts. Such a set of instructions for performing a particular task may be characterized as a program software program, software, engine, module, component, mechanism, or tool. The remote response system components 710 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. In embodiments of the invention, Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to magnetic tape cassettes, flash memory cards, digital versatile disks, digital video tape, solid state RAM, solid state ROM, and the like. The storage media are typically connected to the system bus through a removable or non-removable memory interface.

The processing unit 710 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 730 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 720. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. Any type of mobile device, such as for example Ipads, tablets, Iphones, or Blackberries may be utilized in connection with embodiments of the invention. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 8:
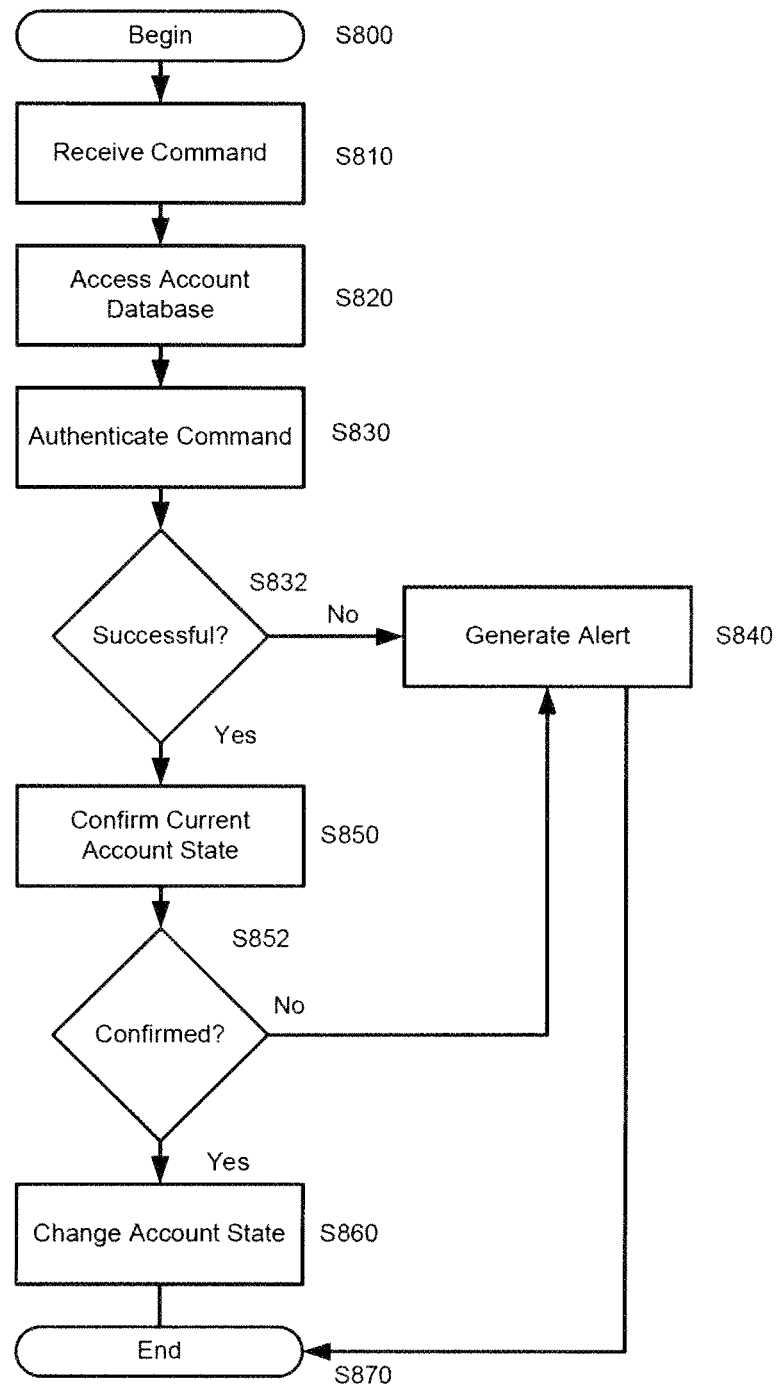
FIG. 8 is a flow chart illustrating a method for activation and deactivation of a financial account in accordance with an embodiment of the invention.

FIG. 8 is a flow chart illustrating a method for activation and deactivation of a financial account in accordance with an embodiment of the invention. As illustrated, the method begins in S800 and the remote response system receives a command at S810, preferably from a remote device implementing one of the UI configurations described above. In S820, the remote response system accesses an account database. In S830, using the information from the account database, the remote response system authenticates the command as described above, either by authenticating the remote device, authenticating the account holder, or both. In S832, the remote response system determines whether the authentication was successful. If the authentication fails in S832, the system generates an alert in S840. If the authentication succeeds in S832, the system confirms the current account state in S850. If the account state cannot be confirmed in S850, the remote response system generates an alert in S840. If the account state is confirmed in S850, the system changes the account state in S860. The process ends in S870.

The above-identified steps and the order of the steps are merely exemplary and should not be viewed as limiting. The steps may be performed in any logical order and additional or fewer steps may be performed as the situation requires.

The system described herein has many applications and is useful, for example, when a cardholder accidentally leaves a card in a hotel room, or in a vehicle. The cardholder may expect to retrieve the card but wants to ensure that it is unavailable to others in the interim. The system not only provides control for cardholders, but also proactively protects financial institutions for responsibility from unauthorized account use for the accounts enrolled in the program.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

What is claimed is:

1. A computer-implemented remote control method for providing financial account security to prevent unauthorized use of the financial account, the method comprising:
storing in at least one computer memory, data and instructions pertaining to financial accounts;
accessing the at least one computer memory using at least one computer processor to execute the instructions and to perform steps including:
providing, for an account holder computing device, a graphical user interface for facilitating and providing a first set of two or more selectable options for automatic activation and deactivation of the financial account, wherein the account holder initiates the activation and deactivation;
generating, by said at least one computer processor, an account holder command from the account holder through the provided graphical user interface;

receiving over a network, from the account holder computing device, said account holder command;

validating said account holder command;

authenticating, by said at least one computer processor, the account holder command; and processing, by said at least one computer processor, the account holder command entered through the provided graphical user interface using a command processing engine, the command processing engine changing an account status from an active state that allows transactions based on the identity of the account holder to an inactive state that denies transactions based on the identity of the account holder when the command is a deactivation command and from an inactive state to an active state when the command is an activation command, wherein the account status does not change until a subsequent account holder command is received;

wherein a second set of two or more selectable options at least permit the account holder to either authorize or dispute a charge associated with the financial account.

2. The method of claim 1, wherein authenticating the account holder command comprises verifying registration of the account holder device.

3. The method of claim 1, wherein authenticating the account holder command comprises authenticating the requestor as the account holder.

4. The method of claim 3, wherein authenticating the requestor as the account holder comprises implementing at least one of biometric comparison, security questions, passwords, and sending an alert requiring a response.

5. The method of claim 1, wherein providing a graphical user interface comprises providing selectable accounts for activation and deactivation.

6. The method of claim 1, wherein providing a graphical user interface comprises providing selectable categories of goods and services and a selectable account status for each category.

7. The method of claim 1, wherein providing a graphical user interface comprises a scheduling function allowing the account holder to select dates for changing the account status.

8. The method of claim 1, further comprising receiving a payment request from a merchant and processing the payment request by checking the account status and paying the merchant if the account is in an active status.

9. The method of claim 8, further comprising paying the merchant if the account is in an inactive status if the payment request is for a recurring payment.

10. The method of claim 1, wherein the account holder computing device comprises one of a smart phone, a tablet, a desktop computer and a laptop computer.

* * * * *